Aug. 15, 1961 H. A. TOULMIN, JR 2,996,429
METHOD AND APPARATUS FOR GROWING LIVING TISSUE
Filed Feb. 12, 1959 3 Sheets-Sheet 2
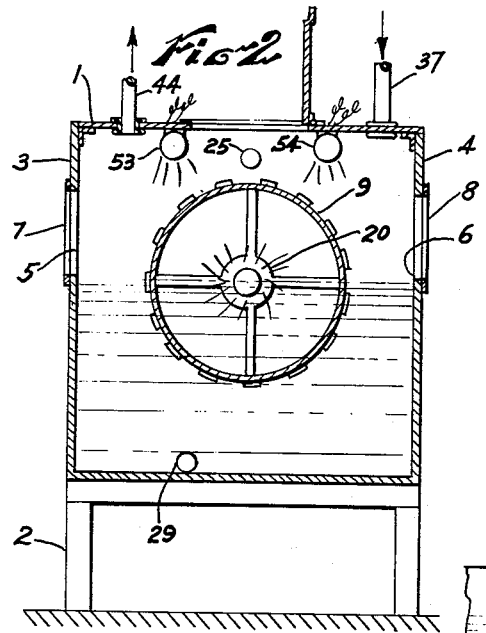
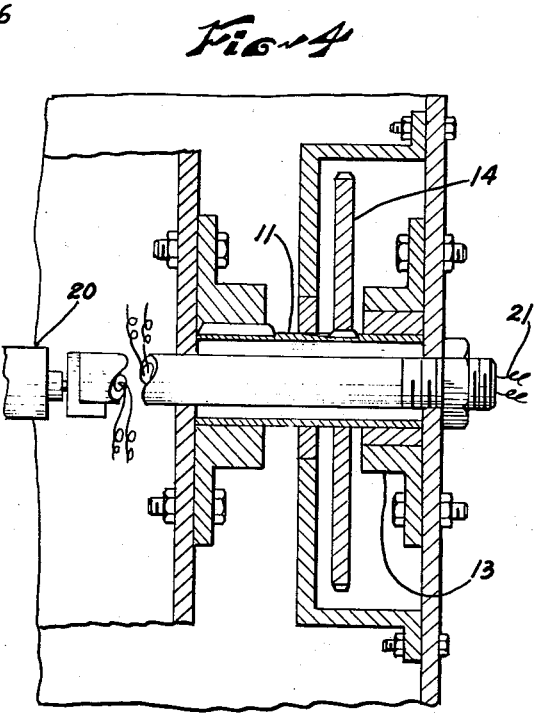
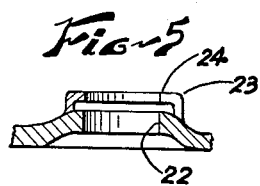
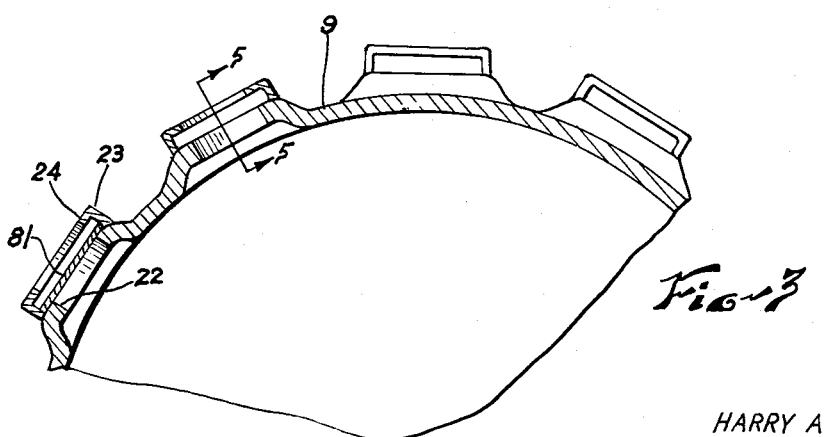
INVENTOR.
HARRY A. TOULMIN, JR.
BY Toulmin & Toulmin
ATTORNEY'S

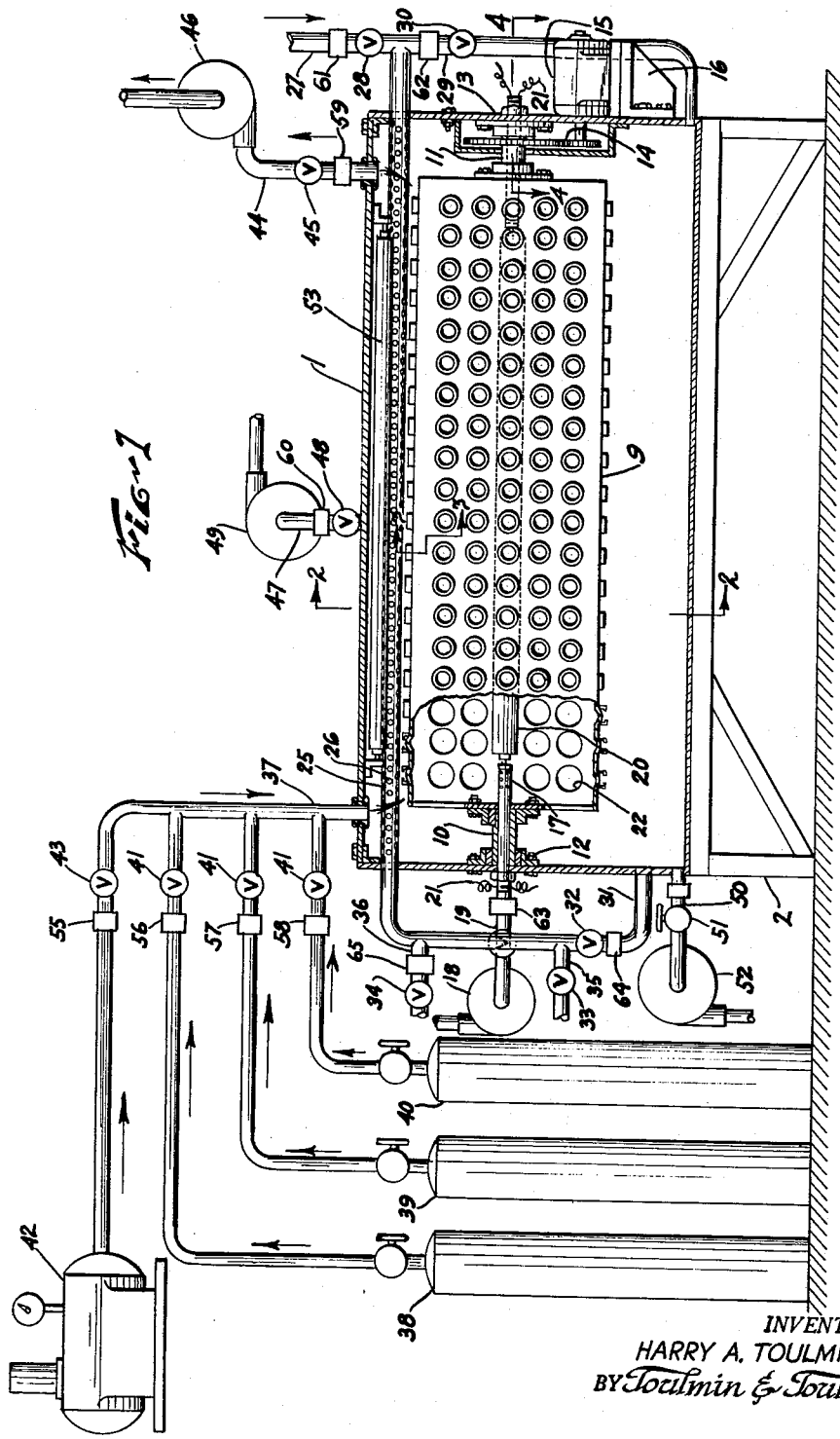

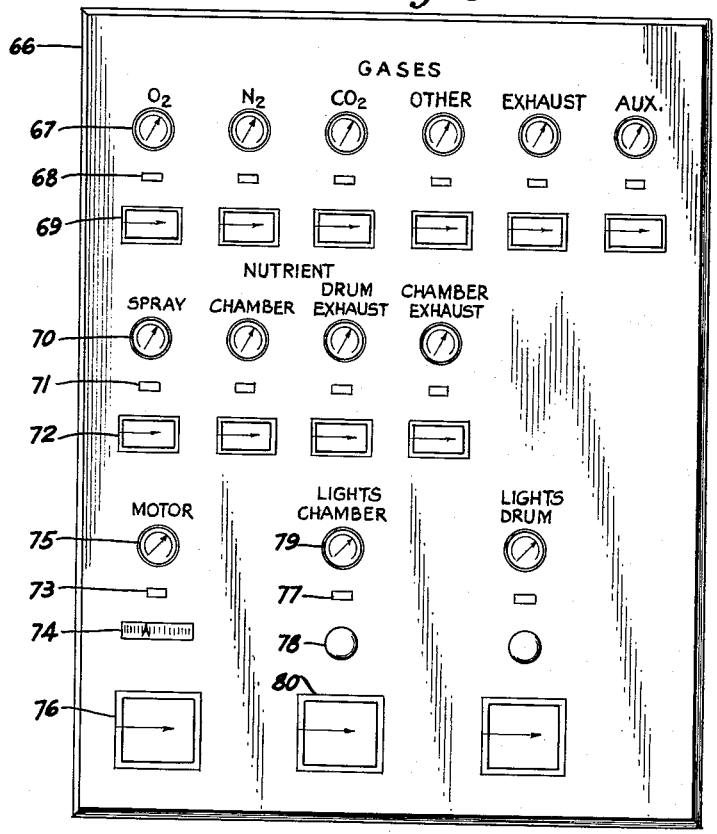

United States Patent Office 2,996,429
Patented Aug. 15, 1961

2,996,429
METHOD AND APPARATUS FOR GROWING LIVING TISSUE
Harry A. Toulmin, Jr., Dayton, Ohio, assignor to National Toxicological Laboratories, Inc., Dayton, Ohio, a corporation of Delaware
Filed Feb. 12, 1959, Ser. No. 792,899
6 Claims. (Cl. 167—78)

The present invention relates to a method and apparatus for growing living tissue, more particularly, to rapid culture of large quantities of tissue under standardized conditions, which conditions can be accurately reestablished if so desired.

The growing of living animal tissue is of considerable importance since these tissues are used in numerous medical experiments. For example, cancer research requires considerable amounts of living tissues grown under exacting conditions. Also, the production and development of various vaccines require substantial quantities of living tissue.

Numerous workers in the field of tissue culture have developed numerous techniques for growing specific tissues. These techniques have varied somewhat, dependent upon the ultimate use to which the tissues are to be put. However, very little work, if any, has been done in the field of tissue culture toward producing large quantities of tissue under accurately determined conditions. It can be appreciated that while conditions can be accurately determined in a laboratory, the quantities of tissues grown in the laboratory are small and are usually merely sufficient to satisfy the needs of that laboratory.

The present invention provides a method and apparatus for the growing of large quantities of tissue under accurately determined conditions. At the same time, the apparatus is so constructed that the sterile conditions necessary for tissue culture are readily maintained. The invention further provides for the control and measurement of the elements used in this apparatus so that a permanent and accurate record will be available.

It is therefore the principal object of this invention to provide a novel and improved method and apparatus for the growing of living tissue.

It is a further object of this invention to provide a method and apparatus for growing large quantities of tissue such as may be needed in experimental work.

It is another object of this invention to provide a method and apparatus for standardizing and recording conditions under which tissues are grown.

It is an additional object of this invention to provide a method and apparatus which will enable one to determine the optimum conditions for growing specific tissues.

Other objects and advantages of this invention will become apparent upon reference to the accompanying description and to the following drawings, wherein:

FIGURE 1 is a side elevational view of the apparatus of this invention with the chamber being shown in a vertical sectional view;

FIGURE 2 is a sectional view taken along the line 2—2 of FIGURE 1;

FIGURE 3 is a sectional view taken along the line 3—3 of FIGURE 1 to show the structure of the face of the drum;

FIGURE 4 is a sectional view taken along the line 4—4 of FIGURE 1 to show the details of the journal arrangement for the drum;

FIGURE 5 is a sectional view taken along the line 5—5 of FIGURE 3 to further illustrate the structure by which the membrane may be supported on a drum opening; and FIGURE 6 is a front elevational view of the control board for the apparatus of this invention.

Proceeding next to FIGURE 1, wherein like reference symbols indicate the same parts throughout the various views, the culture chamber of this apparatus is indicated at 1. The chamber 1 is substantially rectangular in cross section and is mounted upon a supporting frame 2. The sides of the chamber 3 and 4 have openings 5 and 6 therein. These openings are covered by transparent inspection panels 7 and 8 which are readily detachable to permit access into the chamber. The transparency of these panels enables the tissues to be observed during the growing process. The top surface of the chamber may also be provided with an inspection opening covered by a removable and transparent panel.

Within the culture chamber 1 there is rotatably mounted a cylindrical drum 9. The drum is hollow and closed at the ends thereof and having mounted thereon the partial shafts 10 and 11. These shafts are respectively journalled in bearings 12 and 13. The shaft 11, which is hollow, is drivingly connected through a gear train 14 to a driving motor 15 mounted on a bracket 16 affixed to the end of the chamber.

The other partial shaft 10 is also hollow and has openings 17 in that part of the shaft extending into the drum. A pump 18 is connected through piping 19 to the partial shaft 10 in order to withdraw used nutrient from the interior of the drum as will be later described. This used nutrient may be recirculated by passing it through the spray pipe 25.

A light 20 is mounted within the drum 9 and is supported at each end by the partial shafts 10 and 11. The light may be ultraviolet or may emit any other wave length of light which may be desired. The light is energized by electric leads 21 extending through both of the partial shafts 10 and 11.

The drum 9 has a plurality of openings 22 on the cylindrical surface thereof. These openings are substantially uniformly spaced, and each opening is raised, as may be seen in FIGURE 3. A clamp ring 23 having an overhanging lip 24 is detachably secured to each of the openings by threads or by any other fastening arrangement.

A spray pipe 25 is positioned within the chamber above the drum. The pipe has a plurality of fine openings 26 therein. The pipe 25 is connected to a main pipe 27 having a valve 28 therein and which leads to the supply of fresh nutrient. A branch pipe 29 is also connected to the main pipe 27 to enable the nutrient to be introduced either through the spray pipe or into the tank at the bottom thereof, or both. A solenoid-actuated valve 30 is placed in the branch line for controlling the liquid flowing therethrough.

A nutrient-discharge pipe 31 is mounted at the other end of the chamber near the bottom thereof. The pipe 31 is used to recirculate the nutrient through the chamber through the spray pipe. It may be desired to connect the pipe 31 to suitable apparatus for removing the toxic metabolism products from the nutrient prior to reintroducing the nutrient into the chamber. A valve 32, which may be both solenoid- and hand-operated, is located in the discharge pipe 31, and similar valves 33 and 34 are located in the branch lines 35 and 36 which connect the nutrient purification apparatus with the branch line 31.

A gas-intake pipe 37 is connected to the top surface of the chamber 1. The pipe 37 has a filter therein to sterilize the gases entering the culture chamber. The pipe 37 is connected to three tanks, 38 containing oxygen, 39 containing carbon dioxide, and 40 containing nitrogen. Similar solenoid- and hand-operated valves 41 are located to control the flow of gas from each of the tanks, 38, 39 and 40.

A fourth tank 42, which may contain any other gas which should be needed for the growth of a particular tissue, is also connected to the gas-intake pipe 37 and includes a valve 43 to control the flow of gas therefrom.

The gas is exhausted from the chamber through an exhaust pipe 44 having a valve 45 and which is mounted on the top surface of the chamber at the opposite end from the gas-intake pipe. The exhaust pipe similarly comprises a filter to guard against impurities entering the culture chamber. A pump 46 is used to withdraw the gases through the exhaust pipe.

On the top surface of the chamber there is provided an auxiliary gas connection 47 which has a valve 48. This connection includes a pump 49 which is both pressure and exhaust. This connection is used to increase the rate of exhausting of the chamber, or can be used to introduce an additional gaseous element therein.

A nutrient drain pipe 50 is mounted on one end of the culture chamber at the bottom thereof, for use in emptying the chamber of the nutrient. The pipe is provided with a valve 51 and an exhaust pump 52. A meter may be mounted in the pipe 50. Two lights 53 and 54 are mounted within the chamber in the upper portion thereof on either side of the spray pipe 25. These lights similarly provide either ultraviolet or artificial sunlight.

There are meters 55 through 65 located in the various gas and fluid supply and exhaust lines, as indicated. These meters are of the type which measure the quantity of gas or liquid which is passed therethrough. By connecting these meters to recording instruments as will be later described, a continuous and accurate record will be maintained of the various elements used in the culture chamber.

Proceeding next to FIGURE 6, there is illustrated a control board 66 which is used to control and record the numerous variables to which the tissue within the culture chamber is exposed.

The controls for the gases comprise a timer 67, an on/off switch 68, and a recording instrument 69. The timer is the type which may be set so as to deliver a particular quantity of gas into the chamber for a predetermined time. The switch 68 will both operate the corresponding solenoid-actuated valve and will start the respective pump in order to introduce or withdraw the gas from the chamber. It is to be noted that the switch may be operated either manually or by the timer. This set of controls is repeated for each gas intake and exhaust, as is indicated on the control board.

The controls for the nutrient similarly comprise a timer 70, a switch 71, and a recorder 72. These elements operate in the same manner as described in connection with the gas controls. A set of the nutrient controls is provided for each of the nutrient supply and discharge lines, as indicated on the control board.

The motor 15 for controlling the rotation of the drum 9 is started and stopped by a switch 73, and the speed of the motor may be regulated by a suitable speed-control device shown at 74. In addition, there is provided a timer 75 and a recorder 76.

The lights in both the chamber and the drum are controlled by an on/off switch 77, a rheostat 78 for controlling the voltage of the lights, a timer 79, and a recording instrument 80 which may be a recording watt-hour meter.

All of the meters 55 through 65 are connected to corresponding recorders which are provided for the gas and nutrient controls. The meters 55 through 60 are connected to the gas recorders 69 and the meters 61 through 65 are connected to the nutrient recorders 72.

The process of growing tissue disclosed as this invention and which can be carried out with the apparatus described above, will next be discussed. To begin the process a semi-permeable membrane 81 which may be from three to five centimeters (cm.) in diameter is clamped over each of the drum openings 22 by the clamp 23. This membrane preferably has light-transmitting properties and constitutes a dialyzing membrane permeable to the culture medium. Various forms of cellophane may be used. Such a material in its regenerated cellulose form will transmit both natural and artificial light. The cellophane thus will constitute a solid support for the tissue which is to be grown.

Prior to placing the cellophane on the drum openings, the cellophane is cleaned by acetone, alcohol, ether, and redistilled water.

The nutrient is then added to the chamber through the spray pipe. This liquid nutrient will comprise:

| | Percent |
|---|---|
| Tyrode solution | 40 |
| Serum (human, horse, rat) | 40 |
| Embryo extract (chick or mammalian) | 20 |
| Phenol red | 0.01 |

The phenol red is for the purpose of checking the hydrogen ion concentration so that the nutrient may be continuously maintained at a pH of about 7.6. For most tissues, the pH must be maintained between 7.2 and 7.6. Sufficient nutrient is added to half-fill the chamber. The nutrient is added at this time so as to soften the cellophane and enable the tissue explant to readily adhere thereto.

Next the tissue explant is mounted on the cellophane membranes through the inspection openings. These explants measure 1 x 1 x 1 millimeter (mm.). In about 25 to 35 minutes after being placed upon the cellophane membrane, the tissue will adhere to the membrane. During the positioning of the tissue, the drum is revolved at a speed of about one revolution per hour. With some forms of tissue, it may be desirable to incubate the tissue for a period of 24 hours before the process of slowly rotating the drum and continuously supplying the chamber with nutrient is commenced.

Next the gaseous mixture is added to the chamber. This mixture has a volume of about 2,000 times the volume of the tissue explants. The gas mixture has a double purpose. These purposes are:

(1) To supply the oxygen required by the tissue to maintain respiration; and (2) To provide the $CO_2$ necessary to establish the desired pH.

The gas mixture usually comprises:

| | Percent |
|---|---|
| Oxygen | 21 |
| Carbon dioxide | 3 |
| Nitrogen | 76 |

It is to be understood that the relative proportions of these gases depend upon the nature of the tissue, the composition of the culture medium, and the purpose for which the tissues are being grown.

If desired, the lights in both the chamber and the drum are illuminated. Whether the lights are used will depend upon the rate at which cell growth is desired. In the present invention, which is concerned with mass production of cells, the cells will be exposed to artificial sunlight so that they will grow fast in the beginning and die relatively early. On the other hand, if the cells are maintained in the dark, they will grow slowly in the beginning and will last for a relatively long time.

The temperature of the chamber is maintained between 26° C. and 44° C. It is noted that tissues will generally grow at a rate which is proportional to the temperature. However, when the temperature is increased above 44° C., the rate of growth will decrease and the tissues will die relatively early.

After all of the tissues have been fastened upon the cellophane membranes and a period of incubation has been completed, the drum is now rotated at a speed of about twelve revolutions per hour. Although the drum is only partially submerged, the tissues will be in contact with the nutrient at all times. The overhanging lips 24 of the tissue clamp rings will retain nutrient as the tissue rises out of the nutrient because of the revolution of the drum. The amount of nutrient retained by the lips will be sufficient to nourish the tissues during the periods of time that the tissues are above the surface of the nutrient.

As the nutrient feeds the tissue, it will pass through the semi-permeable membrane into the interior of the drum. This passage of the nutrient through the tissue will be aided by the greater pressure within the chamber outside of the drum, and the lower pressure in the interior of the drum. As the drum fills with used nutrient to the point where the level of the nutrient reaches the partial shafts, the nutrient will be withdrawn through the partial shaft 10 under the action of a pump. The constant use of this exhaust pump will maintain a lower pressure within the drum than will be present on the exterior of the drum. By removing the nutrient through the interior of the rotating drum, it will be possible to eliminate the metabolic waste products of the tissue-growing process. At this point it will be possible to continuously introduce fresh nutrient into the chamber and to withdraw used nutrient from the interior of the drum. If the used nutrient were not withdrawn, the foul air and the toxic waste products of the tissue-growing process would kill the tissue cells in about seven to nine days.

After a period of two or three days of tissue growth, the chamber is completely drained of nutrient, and gases are completely exhausted therefrom. The tissue cultures are then sprayed with Tyrode solution for ten to fifteen minutes to bath the cultures. Tyrode solution is then drained, and fresh nutrient and gases are added thereto. The process is thus continued until the desired tissue growth has been reached. The tissues can then be removed through the inspection openings.

As a modification of this process, it is possible to use perforated cellophane as the solid support for the tissue growth. In this instance, the cellophane will be considerably smaller than the 3 to 5 cc. diameter used in the embodiment of the invention described above. The tissue which is to be grown is then clamped on the inner surface of the perforated cellophane with respect to the drum. In this instance, as the tissue grows and covers the surface of the cellophane, the tissue itself will act as a dialyzing membrane through which the nutrient will pass. The remaining steps of the process are similar.

Thus it can be seen that the present invention discloses a method and apparatus for the growing of tissue which can be used to continuously provide fresh nutrient and fresh gases so as to grow large quantities of tissue in short periods of time. Accordingly, it is now possible to provide tissues in the large quantities which are needed in research.

It will be understood that this invention is susceptible to modification in order to adapt it to different usages and conditions, and accordingly, it is desired to comprehend such modifications within this invention as may fall within the scope of the appended claims.

What I claim is:

1. A method of growing animal tissue comprising the steps of providing a chamber enclosing a nutrient bath of animal serum and embryo extract, arranging a dialyzing membrane over the surface of a drum which is disposed in the chamber and partially submerged in said nutrient bath, rotating the drum to cause said membrane to move in and out of the nutrient bath, mounting a tissue explant on one side of said membrane, conditioning the atmosphere in the chamber by introducing a gaseous mixture of oxygen, nitrogen and carbon dioxide, and exposing the tissue explant on said membrane to light waves while moving the membrane in and out of the nutrient bath.

2. A method of growing animal tissue comprising the steps of providing a chamber enclosing a nutrient bath of animal serum and embryo extract, arranging a dialyzing membrane over the surface of a drum which is disposed in the chamber and partially submerged in said nutrient bath, rotating the drum to cause said membrane to move in and out of the nutrient bath, mounting a tissue explant on one side of said membrane, conditioning the atmosphere in the chamber by introducing a gaseous mixture of oxygen, nitrogen and carbon dioxide, and exposing the tissue explant on said membrane to light waves, and withdrawing used nutrient while introducing fresh nutrient to continuously supply said tissue explant with a nutrient.

3. A method of growing animal tissue comprising the steps of providing a chamber enclosing a nutrient bath of animal serum and embryo extract, arranging a dialyzing membrane over the surface of a drum which is disposed in the chamber and partially submerged in said nutrient bath, rotating the drum to cause said membrane to move in and out of the nutrient bath, mounting a tissue explant on one side of said membrane, maintaining the pH of the nutrient between 7.2 and 7.6, conditioning the atmosphere in the chamber by introducing a gaseous mixture of oxygen, nitrogen and carbon dioxide, and exposing the tissue explant on said membrane to light waves, and continuously circulating the nutrient through said membrane to nourish the tissue explant.

4. In an apparatus for growing animal tissue, a chamber, means for introducing a liquid nutrient into said chamber, a rotatable drum in said chamber, said drum being closed at its opposite ends and having a plurality of openings over the surface thereof, means comprising a dialyzing membrane mounted on said drum and covering said openings, said membrane being adapted to carry a tissue explant, means for rotating said drum to periodically move the membrane through said nutrient, means for introducing a gaseous mixture of oxygen, nitrogen and carbon dioxide into said chamber to provide an atmosphere for said tissue explant, and means comprising a light source disposed in said chamber for subjecting said membrane to the action of light waves.

5. In an apparatus for growing animal tissue, a chamber, means for introducing a liquid nutrient into said chamber, a rotatable drum in said chamber, said drum being closed at its opposite ends and having a plurality of openings over the surface thereof, means comprising a dialyzing membrane mounted on said drum and covering said openings, said membrane being adapted to carry a tissue explant, means for rotating said drum to periodically move the membrane through said nutrient, means for introducing a gaseous mixture of oxygen, nitrogen and carbon dioxide into said chamber to provide an atmosphere for said tissue explant, means comprising a light source located in said chamber and an additional light source within said drum for subjecting said membrane to the action of light waves, and means for continuously maintaining the nutrient in contact with the tissue explant on the membrane.

6. In an apparatus for growing animal tissue, a chamber, means for introducing a liquid nutrient into said chamber, a rotatable drum in said chamber, said drum being closed at its opposite ends and having a plurality of openings over the surface thereof, means comprising a dialyzing membrane mounted on said drum and covering said openings, said membrane being adapted to carry a tissue explant, means for rotating said drum to periodically move the membrane through said nutrient, means for introducing a gaseous mixture of oxygen, nitrogen and carbon dioxide into said chamber to provide an atmosphere for said tissue explant, means comprising a light source disposed in said chamber for subjecting said membrane to the action of light waves, and means connected to said chamber for continuously withdrawing nutrient from the chamber and introducing fresh nutrient for nourishing said tissue.

(References on following page)

References Cited in the file of this patent

UNITED STATES PATENTS

| | | |
|---|---|---|
| 2,686,754 | Monod | Aug. 17, 1954 |
| 2,715,795 | Pallotta | Aug. 23, 1955 |

FOREIGN PATENTS

| | | |
|---|---|---|
| 704,872 | Great Britain | Mar. 3, 1954 |

OTHER REFERENCES

Annals of N.Y. Academy of Science, vol. 58, art. 7, November 17, 1954, Tissue Cul. Tech. in Pharm., pp. 1000–1011, 1039–1055.

Page: J. of National Cancer Inst. 19: 6, December 1957, pp. 1065–1075.